US010325352B1

United States Patent
Kim et al.

(10) Patent No.: US 10,325,352 B1
(45) Date of Patent: Jun. 18, 2019

(54) METHOD AND DEVICE FOR TRANSFORMING CNN LAYERS TO OPTIMIZE CNN PARAMETER QUANTIZATION TO BE USED FOR MOBILE DEVICES OR COMPACT NETWORKS WITH HIGH PRECISION VIA HARDWARE OPTIMIZATION

(71) Applicant: Stradvision, Inc., Pohang (KR)

(72) Inventors: Kye-Hyeon Kim, Seoul (KR); Yongjoong Kim, Pohang-si (KR); Insu Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Donghun Yeo, Pohang-si (KR); Wooju Ryu, Pohang-si (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang (KR)

( * ) Notice: Subject to any disclaimer, the term of this patent is extended or adjusted under 35 U.S.C. 154(b) by 0 days.

(21) Appl. No.: 16/255,197

(22) Filed: Jan. 23, 2019

(51) Int. Cl.
*G06K 9/00* (2006.01)
*G06T 3/40* (2006.01)

(52) U.S. Cl.
CPC .......... *G06T 3/4046* (2013.01); *G06T 3/4084* (2013.01)

(58) Field of Classification Search
CPC ..................... G06T 3/4084; G06T 3/4046
See application file for complete search history.

(56) References Cited

U.S. PATENT DOCUMENTS

| | | | |
|---|---|---|---|
| 10,127,495 B1 * | 11/2018 | Bopardikar | G06N 3/08 |
| 10,198,671 B1 * | 2/2019 | Yang | G06K 9/6269 |
| 2016/0148079 A1 * | 5/2016 | Shen | G06K 9/4628 |
| | | | 382/157 |

(Continued)

OTHER PUBLICATIONS

Badrinarayanan et al., SegNet: A Deep Convolutional Encoder-Decoder Architecture for Image Segmentation, IEEE Transactions on Pattern Analysis and Machine Intelligence, Dec. 2017.*

(Continued)

*Primary Examiner* — John B Strege
(74) *Attorney, Agent, or Firm* — XSensus LLP

(57) ABSTRACT

There is provided a method for transforming convolutional layers of a CNN including m convolutional blocks to optimize CNN parameter quantization to be used for mobile devices, compact networks, and the like with high precision via hardware optimization. The method includes steps of: a computing device (a) generating k-th quantization loss values by referring to k-th initial weights of a k-th initial convolutional layer included in a k-th convolutional block, a (k−1)-th feature map outputted from the (k−1)-th convolutional block, and each of k-th scaling parameters; (b) determining each of k-th optimized scaling parameters by referring to the k-th quantization loss values; (c) generating a k-th scaling layer and a k-th inverse scaling layer by referring to the k-th optimized scaling parameters; and (d) transforming the k-th initial convolutional layer into a k-th integrated convolutional layer by using the k-th scaling layer and the (k−1)-th inverse scaling layer.

14 Claims, 6 Drawing Sheets

(56) References Cited

U.S. PATENT DOCUMENTS

| | | | |
|---|---|---|---|
| 2017/0011281 A1* | 1/2017 | Dijkman | G06K 9/66 |
| 2017/0124409 A1* | 5/2017 | Choi | G06N 3/0454 |
| 2017/0124415 A1* | 5/2017 | Choi | G06N 3/08 |
| 2017/0132496 A1* | 5/2017 | Shoaib | G06K 9/66 |
| 2017/0169315 A1* | 6/2017 | Vaca Castano | G06K 9/3233 |
| 2017/0206431 A1* | 7/2017 | Sun | G06N 3/084 |
| 2018/0032857 A1* | 2/2018 | Lele | G06N 3/04 |
| 2018/0096457 A1* | 4/2018 | Savvides | G06K 9/6267 |
| 2018/0107925 A1* | 4/2018 | Choi | G06F 17/16 |
| 2018/0107926 A1* | 4/2018 | Choi | G06F 7/582 |
| 2018/0197081 A1* | 7/2018 | Ji | G06N 3/0454 |
| 2018/0211403 A1* | 7/2018 | Hotson | G06K 9/4604 |
| 2018/0247180 A1* | 8/2018 | Cheng | G06K 9/46 |
| 2018/0268234 A1* | 9/2018 | Yang | G06N 3/063 |
| 2019/0012548 A1* | 1/2019 | Levi | G06K 9/00791 |
| 2019/0020871 A1* | 1/2019 | Xu | H04N 19/124 |
| 2019/0050681 A1* | 2/2019 | Tate | G06K 9/6232 |
| 2019/0073553 A1* | 3/2019 | Yao | G06K 9/46 |
| 2019/0095777 A1* | 3/2019 | Kim | G06N 3/04 |

OTHER PUBLICATIONS

Sun et al., Face detection using deep learning: an improved faster RCNN approach, Elsevier B.V., Mar. 2018.*

Ren et al., Faster R-CNN: Towards Real-Time Object Detection with Region Proposal Networks, 2015.*

Du et al., Fused DNN: A deep neural network fusion approach to fast and robust pedestrian detection, IEEE, 2017.*

* cited by examiner

METHOD AND DEVICE FOR TRANSFORMING CNN LAYERS TO OPTIMIZE CNN PARAMETER QUANTIZATION TO BE USED FOR MOBILE DEVICES OR COMPACT NETWORKS WITH HIGH PRECISION VIA HARDWARE OPTIMIZATION

FIELD OF THE DISCLOSURE

The present disclosure relates to a method for transforming CNN layers to optimize CNN parameter quantization to be used for mobile devices or compact networks with high precision via hardware optimization; and more particularly, the method for transforming convolutional layers of a CNN including m convolutional blocks, including steps of: (a) if an input image to be used for determining scaling parameters is acquired, generating one or more k-th quantization loss values by referring to (i) one or more k-th initial weights of a k-th initial convolutional layer included in a k-th convolutional block, (ii) (ii-1) the input image in case k is 1, (ii-2) a (k−1)-th feature map, corresponding to the input image, outputted from the (k−1)-th convolutional block in case k is from 2 to m, and (iii) (iii-1) each of k-th scaling parameters corresponding to each of channels included in the input image, in case k is 1 and (iii-2) each of k-th scaling parameters corresponding to each of channels included in the (k−1)-th feature map, in case k is from 2 to m, wherein k is an integer from 1 to m; (b) determining each of k-th optimized scaling parameters, corresponding to each of the channels included in the (k−1)-th feature map, among the k-th scaling parameters by referring to the k-th quantization loss values; (c) generating a k-th scaling layer and a k-th inverse scaling layer by referring to the k-th optimized scaling parameters; and (d) (i) in case k is 1, transforming the k-th initial convolutional layer into a k-th integrated convolutional layer by using the k-th scaling layer, and (ii) in case k is an integer from 2 to m, transforming the k-th initial convolutional layer into the k-th integrated convolutional layer by using the k-th scaling layer and the (k−1)-th inverse scaling layer, and a computing device using the same.

BACKGROUND OF THE DISCLOSURE

Deep Convolution Neural Networks, or Deep CNN is the most core of the remarkable development in the field of Deep Learning. Though the CNN has been employed to solve character recognition problems in 1990s, it is not until recently that the CNN has become widespread in Machine Learning. For example, in 2012, the CNN significantly outperformed its competitors in an annual software contest, the ImageNet Large Scale Visual Recognition Challenge, and won the contest. After that, the CNN has become a very useful tool in the field of the machine learning.

However, there was a prejudicial perception that 32-bit floating point operations are needed for the deep learning algorithms, so that mobile devices may be considered as not being capable of performing programs including the deep learning algorithms.

However, by some experiments, it was proved that 10-bit fixed point operations, which require less computing resources than the 32-bit floating point operations, are sufficient for the deep learning algorithms. Thus, there were many attempts to apply the 10-bit fixed point operations to the deep learning algorithms by using devices with limited resources, i.e., the mobile devices.

There were many successful methods for quantizing values in a 32-bit floating point form to values in a 10-bit fixed point form. But, those had a critical shortcoming. On condition that values included in a plurality of channels vary a lot, values of one or more specific channels, including small values, among the channels may be ignored. It can be seen in FIG. 5.

FIG. 5 shows example values of the different channels whose values vary a lot.

By referring to FIG. 5, it can be seen that values included in a first channel of a first feature map, outputted from a first convolutional block 210-1 are (0.64, 0.65, 0.63), and values included in a second channel thereof are (0.002, 0.001, 0.0019). If the values of the first channel and those of the second channel are quantized with conventional techniques, a unit value to be used for the quantization is determined according to the first channel or the second channel.

In case the unit value is determined according to the first channel, the unit value gets larger to represent the values included in the first channel. Then, the values included in the second channel can be quantized as 0, because the unit value is too big for the values included in the second channel. On the contrary, in case the unit value is determined according to the second channel, the unit value gets smaller to represent the values included in the second channel. Then, the values included in the first channel cannot be quantized properly, because the unit value is too small.

If values of a specific channel are ignored or if values of the specific channel are not quantized properly as shown above, an output of the CNN may be distorted.

SUMMARY OF THE DISCLOSURE

It is an object of the present disclosure to solve all the problems explained above.

It is another object of the present disclosure to provide a method for transforming CNN layers to flatten values included in at least one feature map in order to properly reflect values of specific channels including small values on output values.

In accordance with one aspect of the present disclosure, there is provided a method for transforming convolutional layers of a CNN including m convolutional blocks, including steps of: (a) the computing device, if an input image to be used for determining scaling parameters is acquired, generating one or more k-th quantization loss values by referring to (i) one or more k-th initial weights of a k-th initial convolutional layer included in a k-th convolutional block, (ii) (ii-1) the input image in case k is 1, (ii-2) a (k−1)-th feature map, corresponding to the input image, outputted from the (k−1)-th convolutional block in case k is from 2 to m, and (iii) (iii-1) each of k-th scaling parameters corresponding to each of channels included in the input image, in case k is 1 and (iii-2) each of k-th scaling parameters corresponding to each of channels included in the (k−1)-th feature map, in case k is from 2 to m, wherein k is an integer from 1 to m; (b) the computing device determining each of k-th optimized scaling parameters, corresponding to each of the channels included in the (k−1)-th feature map, among the k-th scaling parameters by referring to the k-th quantization loss values; (c) the computing device generating a k-th scaling layer and a k-th inverse scaling layer by referring to the k-th optimized scaling parameters; and (d) the computing device, (i) in case k is 1, transforming the k-th initial convolutional layer into a k-th integrated convolutional layer by using the k-th scaling layer, and (ii) in case k is an integer from 2 to m, transforming the k-th initial convolutional layer into the k-th integrated convolutional layer by using the k-th scaling layer and the (k−1)-th inverse scaling layer.

As one example, at the step of (a), the computing device generates the k-th quantization loss values by further referring to (iv) a BW value, which is the number of bits used to represent weights included in the CNN and values included in feature maps as the binary number and (v) a k-th FL value, which is an absolute value of an exponent of a number represented by an LSB of (i) the k-th initial weights of the k-th initial convolutional layer and (ii) the values included in the (k−1)-th feature map in case k is 2 to m, and the values included in the input image in case k is 1.

As one example, at the step of (a), the k-th quantization loss values are generated by following a formula below, $$\Delta L_k = \sum \frac{\delta L_k}{\delta \theta_p} \frac{Q(C_{k_i} \theta_p, FL, BW)}{C_{k_i}}$$

wherein $\theta_p$ includes (i) values of the (k−1)-th feature map and the k-th initial weights of the k-th initial convolutional feature map in case k is 2 to m, and (ii) values of the input image and the k-th initial weights of the k-th initial convolutional feature map in case k is 1, $C_{k_i}$ is a specific k-th scaling parameter among the k-th scaling parameters, FL and BW are the FL value and the BW value respectively, Q operation is an operation for generating differences between $C_{k_i}\theta_i$ and a quantized value of $C_{k_i}\theta_i$ generated by referring to the FL value and the BW value, wherein, at the step of (b), the computing device determines each of the k-th optimized scaling parameters by selecting the $C_{k_i}$ which makes the $\Delta L_k$ smallest.

As one example, the computing device selects the $C_{k_i}$ by using Nesterov Accelerated Gradient method to thereby determine the k-th optimized scaling parameters.

As one example, at the step of (c), the computing device generates the k-th scaling layer whose components are determined as each of the k-th optimized scaling parameters, and generates the k-th inverse scaling layer whose components are determined as each of inverse of the k-th optimized scaling parameters.

As one example, at the step of (d), the computing device, (1) in case k is 1, transforms the k-th initial convolutional layer into the k-th integrated convolutional layer such that a difference between (i) a result generated by applying operations of the k-th initial convolutional layer and the k-th scaling layer to input values and (ii) a result generated by applying operations of the k-th integrated convolutional layer to the input values is smaller than a threshold value, and (2) in case k is an integer from 2 to m, transforms the k-th initial convolutional layer into the k-th integrated convolutional layer such that a difference between (i) a result generated by applying operations of a (k−1)-th inverse scaling layer, the k-th initial convolutional layer and the k-th scaling layer to the input values and (ii) a result generated by applying operations of the k-th integrated convolutional layer to the input values is smaller than the threshold value.

As one example, the method further includes a step of: (e) the computing device quantizing weights of the k-th integrated convolutional layer included in the k-th convolutional block to thereby generate k-th quantized weights as optimized weights for CNN operations performed by the k-th convolutional block.

In accordance with another aspect of the present disclosure, there is provided a computing device for transforming convolutional layers of a CNN including m convolutional blocks, including: at least one memory that stores instructions; and at least one processor configured to execute the instructions to: perform processes of (I) generating one or more k-th quantization loss values by referring to (i) one or more k-th initial weights of a k-th initial convolutional layer included in a k-th convolutional block, (ii) (ii-1) an input image to be used for determining scaling parameters in case k is 1, (ii-2) a (k−1)-th feature map, corresponding to the input image, outputted from the (k−1)-th convolutional block in case k is from 2 to m, and (iii) (iii-1) each of k-th scaling parameters corresponding to each of channels included in the input image, in case k is 1 and (iii-2) each of k-th scaling parameters corresponding to each of channels included in the (k−1)-th feature map, in case k is from 2 to m, wherein k is an integer from 1 to m, (II) determining each of k-th optimized scaling parameters, corresponding to each of the channels included in the (k−1)-th feature map, among the k-th scaling parameters by referring to the k-th quantization loss values, (III) generating a k-th scaling layer and a k-th inverse scaling layer by referring to the k-th optimized scaling parameters, and (IV) (i) in case k is 1, transforming the k-th initial convolutional layer into a k-th integrated convolutional layer by using the k-th scaling layer, and (ii) in case k is an integer from 2 to m, transforming the k-th initial convolutional layer into the k-th integrated convolutional layer by using the k-th scaling layer and the (k−1)-th inverse scaling layer.

As one example, at the process of (I), the processor generates the k-th quantization loss values by further referring to (iv) a BW value, which is the number of bits used to represent weights included in the CNN and values included in feature maps as the binary number and (v) a k-th FL value, which is an absolute value of an exponent of a number represented by an LSB of (1) the k-th initial weights of the k-th initial convolutional layer and (2) the values included in the (k−1)-th feature map in case k is 2 to m, and the values included in the input image in case k is 1.

As one example, at the process of (I), the k-th quantization loss values are generated by following a formula below, $$\Delta L_k = \sum \frac{\delta L_k}{\delta \theta_p} \frac{Q(C_{k_i} \theta_p, FL, BW)}{C_{k_i}}$$

wherein $\theta_p$ includes (i) values of the (k−1)-th feature map and the k-th initial weights of the k-th initial convolutional feature map in case k is 2 to m, and (ii) values of the input image and the k-th initial weights of the k-th initial convolutional feature map in case k is 1, $C_{k_i}$ is a specific k-th scaling parameter among the k-th scaling parameters, FL and BW are the FL value and the BW value respectively, Q operation is an operation for generating differences between $C_{k_i}\theta_i$ and a quantized value of $C_{k_i}\theta_i$ generated by referring to the FL value and the BW value, wherein, at the step of (b), the computing device determines each of the k-th optimized scaling parameters by selecting the $C_{k_i}$ which makes the $\Delta L_k$ smallest.

As one example, the processor selects the $C_{k_i}$ by using Nesterov Accelerated Gradient method to thereby determine the k-th optimized scaling parameters.

As one example, at the process of (III), the processor generates the k-th scaling layer whose components are determined as each of the k-th optimized scaling parameters, and generates the k-th inverse scaling layer whose components are determined as each of inverse of the k-th optimized scaling parameters.

As one example, at the process of (IV), the processor, (1) in case k is 1, transforms the k-th initial convolutional layer into the k-th integrated convolutional layer such that a difference between (i) a result generated by applying operations of the k-th initial convolutional layer and the k-th scaling layer to input values and (ii) a result generated by applying operations of the k-th integrated convolutional layer to the input values is smaller than a threshold value, and (2) in case k is an integer from 2 to m, transforms the k-th initial convolutional layer into the k-th integrated convolutional layer such that a difference between (i) a result generated by applying operations of a (k−1)-th inverse scaling layer, the k-th initial convolutional layer and the k-th scaling layer to the input values and (ii) a result generated by applying operations of the k-th integrated convolutional layer to the input values is smaller than the threshold value.

As one example, wherein the processor further performs a process of: (V) quantizing weights of the k-th integrated convolutional layer included in the k-th convolutional block to thereby generate k-th quantized weights as optimized weights for CNN operations performed by the k-th convolutional block.

BRIEF DESCRIPTION OF THE DRAWINGS

The drawings attached below to explain example embodiments of the present disclosure are only part of example embodiments of the present disclosure and other drawings may be obtained based on the drawings without inventive work for those skilled in the art.

DETAILED DESCRIPTION OF THE PREFERRED EMBODIMENTS

Figure 1:
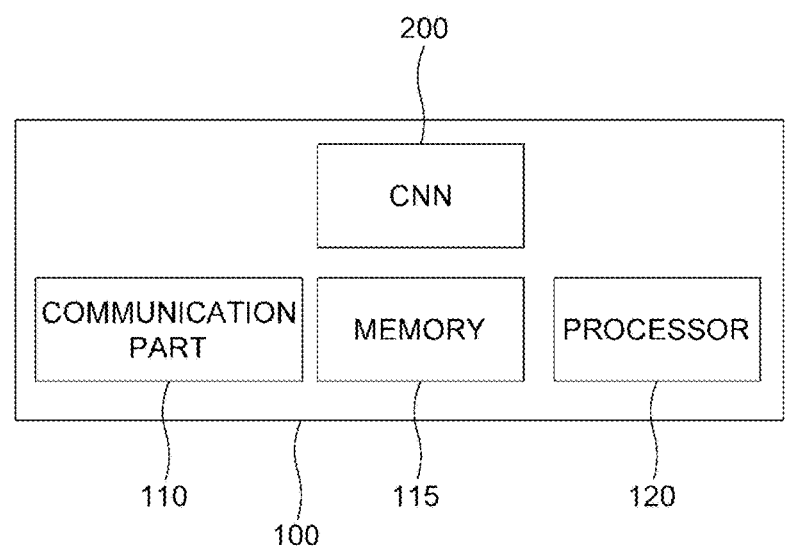
FIG. 1 shows a configuration of a computing device for performing a method for transforming CNN layers in order to optimize CNN parameter quantization in accordance with the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached diagrams will be explained in detail as shown below.

Figure 2:
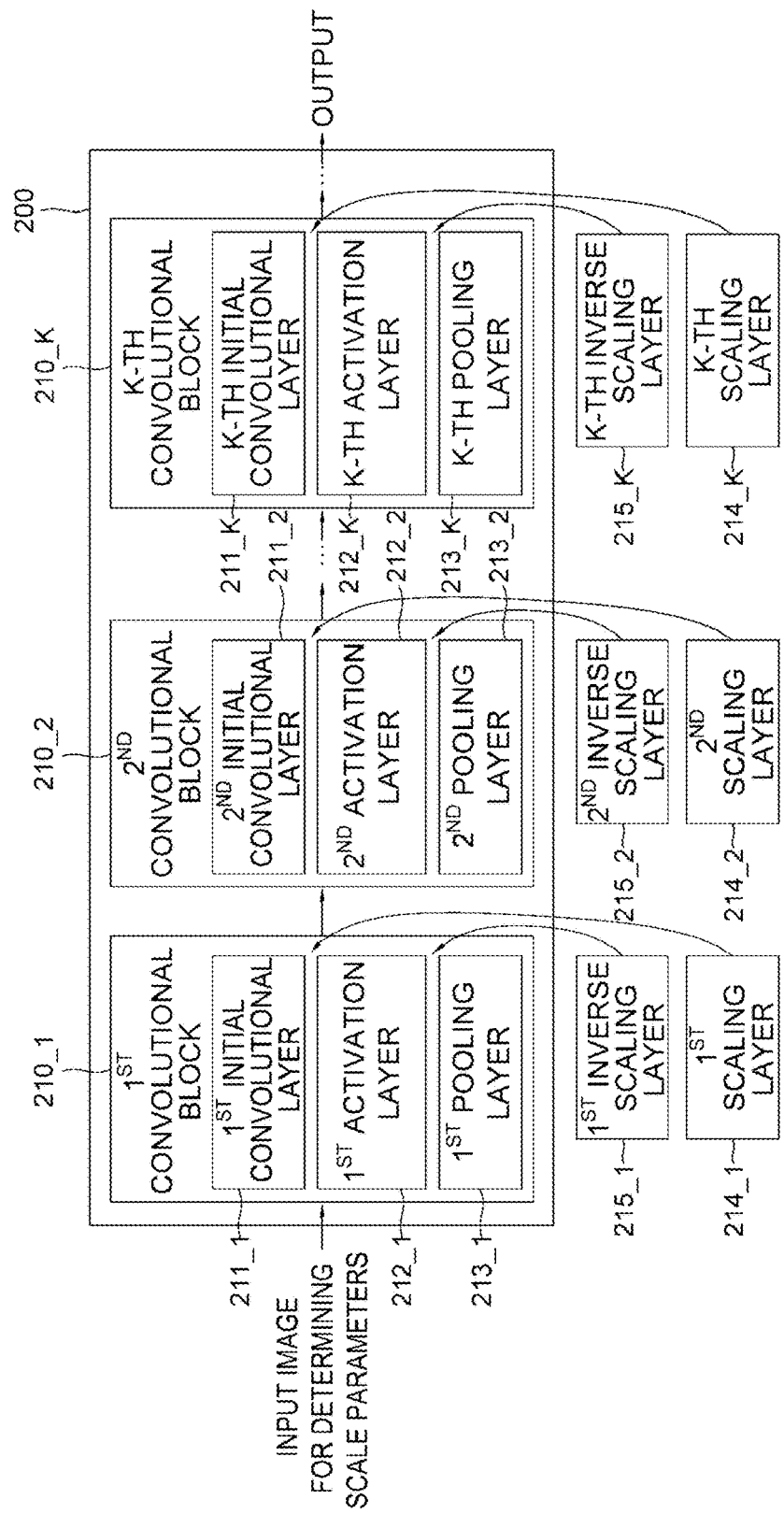
FIG. 2 shows a configuration of a CNN in which scaling layers and inverse scaling layers are included in accordance with the present disclosure.

FIG. 1 shows a configuration of a computing device 100 for performing a method for transforming CNN layers to thereby optimize CNN parameter quantization in accordance with the present disclosure. Further, FIG. 2 shows a configuration of a CNN in which scaling layers and inverse scaling layers are included in accordance with the present disclosure.

By referring to FIG. 1, the computing device 100 may include a CNN 200. Functions of inputting and outputting various data and those of operating the various data of the CNN 200 may be performed by a communication part 110 and a processor 120 therein respectively. But, in FIG. 1, detailed explanation on how the communication part 110 and the processor 120 are connected is omitted. In addition, the computing device may further include a memory 115 capable of storing computer readable instructions for performing following processes. As one example, the processor, the memory, a medium, etc. may be integrated with an integrated processor.

The CNN 200 may include one or more convolutional blocks. Below, it will be assumed that the CNN 200 includes m convolutional blocks for convenience, and k is an integer from 1 to m. Herein, a k-th convolutional block may include a k-th initial convolutional layer 211_k, a k-th activation layer 212_k, and a k-th pooling layer 213_k, as shown in FIG. 2.

Above the configuration of the computing device 100 and the CNN 200 included therein is explained. Below, the process of transforming the k-th initial convolutional layer 211_k will be explained.

First, an input image to be used for determining scaling parameters may be acquired by the communication part 110. Thereafter, the computing device 100 may generate one or more k-th quantization loss values by referring to (i) one or more k-th initial weights of the k-th initial convolutional layer 211_k included in the k-th convolutional block 210_k, (ii) a (k−1)-th feature map to be processed by the k-th convolutional block 210_k and (iii) each of k-th scaling parameters, of the k-th scaling layer 214_k, corresponding to each of channels included in the (k−1)-th feature map. Herein, in case k is 1, the (k−1)-th feature map may denote the input image, and it will be the same below.

The computing device 100 may generate the k-th quantization loss values by further referring to (iv) a BW value, which is the number of bits used to represent each of the k-th initial weights included in the k-th initial convolutional layer and values included in the (k−1)-th feature map as the binary number and (v) a k-th FL value, which is an absolute value of an exponent of a number represented by an LSB of the k-th initial weights included in the k-th initial convolutional layer and the values included in the (k−1)-th feature map.

The computing device 100 may generate the k-th quantization loss values by following a formula below.

$$\Delta L_k = \sum \frac{\delta L_k}{\delta \theta_p} \frac{Q(C_{k_i} \theta_p, FL, BW)}{C_{k_i}}$$

Herein, the formula above represents a process of generating the k-th quantization loss values by differentiating quantization loss. $\theta_p$ may include the values of the (k−1)-th feature map and the k-th initial weights of the k-th initial convolutional layer. $C_{k_i}$ may be a specific k-th scaling parameter, corresponding to an i-th channel included in the (k−1)-th feature map, among the k-th scaling parameters. FL and BW may be the FL value and the BW value respectively. Q operation may be an operation for generating differences between $C_{k_i} \theta_i$ and a quantized value of $C_{k_i} \theta_i$ generated by referring to the FL value and the BW value.

After the k-th quantization loss values are generated as shown above, the computing device 100 may determine each of k-th optimized scaling parameters, corresponding to each of the channels included in the (k−1)-th feature map, among the k-th scaling parameters by referring to the k-th quantization loss values. Specifically, the computing device 100 determines each of the k-th optimized scaling parameters by selecting the $C_{k_i}$ which makes the $\Delta L_k$ smallest. In order to select the $C_{k_i}$, a Nesterov optimization algorithm may be used, but it may not be limited to this.

To apply the Nesterov optimization algorithm, constraints among the k-th scaling parameters should be determined. Thus, the computing device 100 may topologically sort the layers included in the CNN 200. Thereafter, the constraints among the k-th scaling parameters, corresponding to types of the layers, may be determined. However, among the constraints, unnecessary constraints, e.g., duplicated ones, may exist. Thus, some of the constraints may be removed. Herein, in the removing process, information on connection status between the layers may be referred to.

After, the computing device 100 may repeat processes of a forward passing and a backward passing in the CNN 200 and acquire each of 2D histograms corresponding to each of the weights included in each of the layers, to thereby generate graphs of the k-th quantization loss values. Then, the computing device 100 may determine the k-th optimized scaling parameter whose corresponding k-th quantization loss value is the smallest while varying $C_{k_i}$, which is each of the k-th scaling parameters. The varying process may follow a vector moving technique suggested by the Nesterov optimization algorithm.

After the k-th optimized scaling parameters are determined as shown above, the computing device 100 may generate a k-th scaling layer 214_k whose components are determined as each of the k-th optimized scaling parameters corresponding to each of the channels included in the (k−1)-th feature map, and a k-th inverse scaling layer 215_k whose components are determined as each of inverse of the k-th optimized scaling parameters corresponding to each of the channels included in the (k−1)-th feature map.

Below, by referring to FIG. 2, how the k-th scaling layer 214_k and the k-th inverse scaling layer 215_k are inserted into the k-th convolutional block 210_k will be explained.

By referring to FIG. 2, it can be seen that the k-th scaling layer 214_k and the k-th inverse scaling layer 215_k may be inserted to both a front of the activation layer 212_k and a behind thereof respectively. It is because the commutative law can be applied to operations performed by the k-th activation layer 212_k, the k-th scaling layer 214_k, and the k-th inverse scaling layer 215_k. Herein, the operations performed by the k-th activation layer 212_k may be ReLU operations, but those may not be limited to these.

Conv*Act*Pool=Conv*Act*Sc*I.Sc*Pool=
Conv*Sc*Act*I.Sc*Pool

Mathematically, as seen in a formula above, terms of Sc*I.Sc can be added to the original terms, because Sc, i.e., a scaling layer, and I.Sc, i.e., an inverse scaling layer, are in a relationship of inverse function with each other. And, those terms can be moved to the sides of the activation layer because the commutative laws can be applied to the operations performed by those.

Meanwhile, if the k-th scaling layer 214_k and the k-th inverse scaling layer 215_k are added to the CNN 200, it will require more computing resources, which may cause inefficiency. Thus, the present disclosure provides a method for integrating the scaling layers, the initial convolutional layers and the inverse scaling layers. It will be explained by referring to FIG. 3A and FIG. 3B.

Figure 3A:
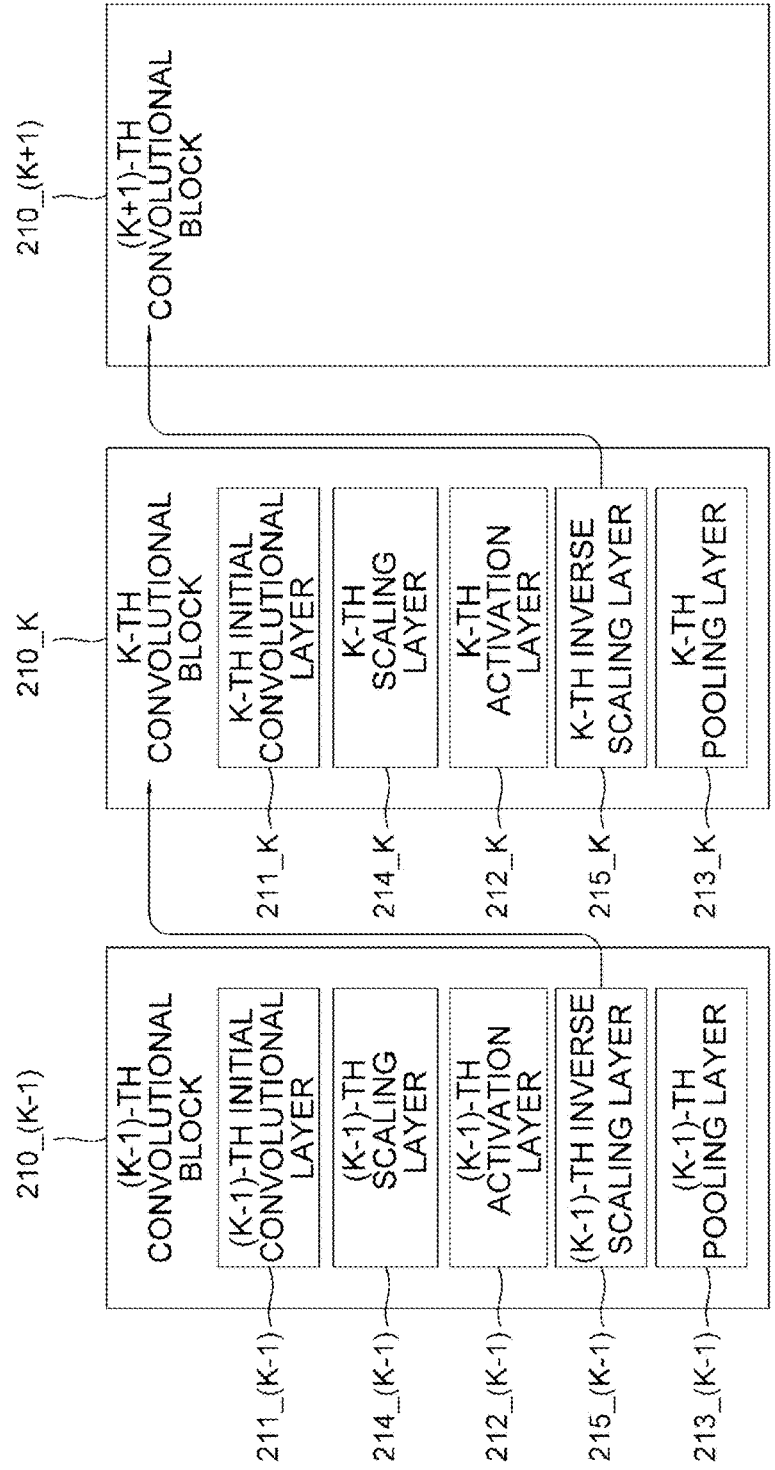
FIG. 3A and FIG. 3B show a process of generating integrated convolutional layers by switching locations of the scaling layers and the inverse scaling layers in accordance with the present disclosure.
Figure 3B:
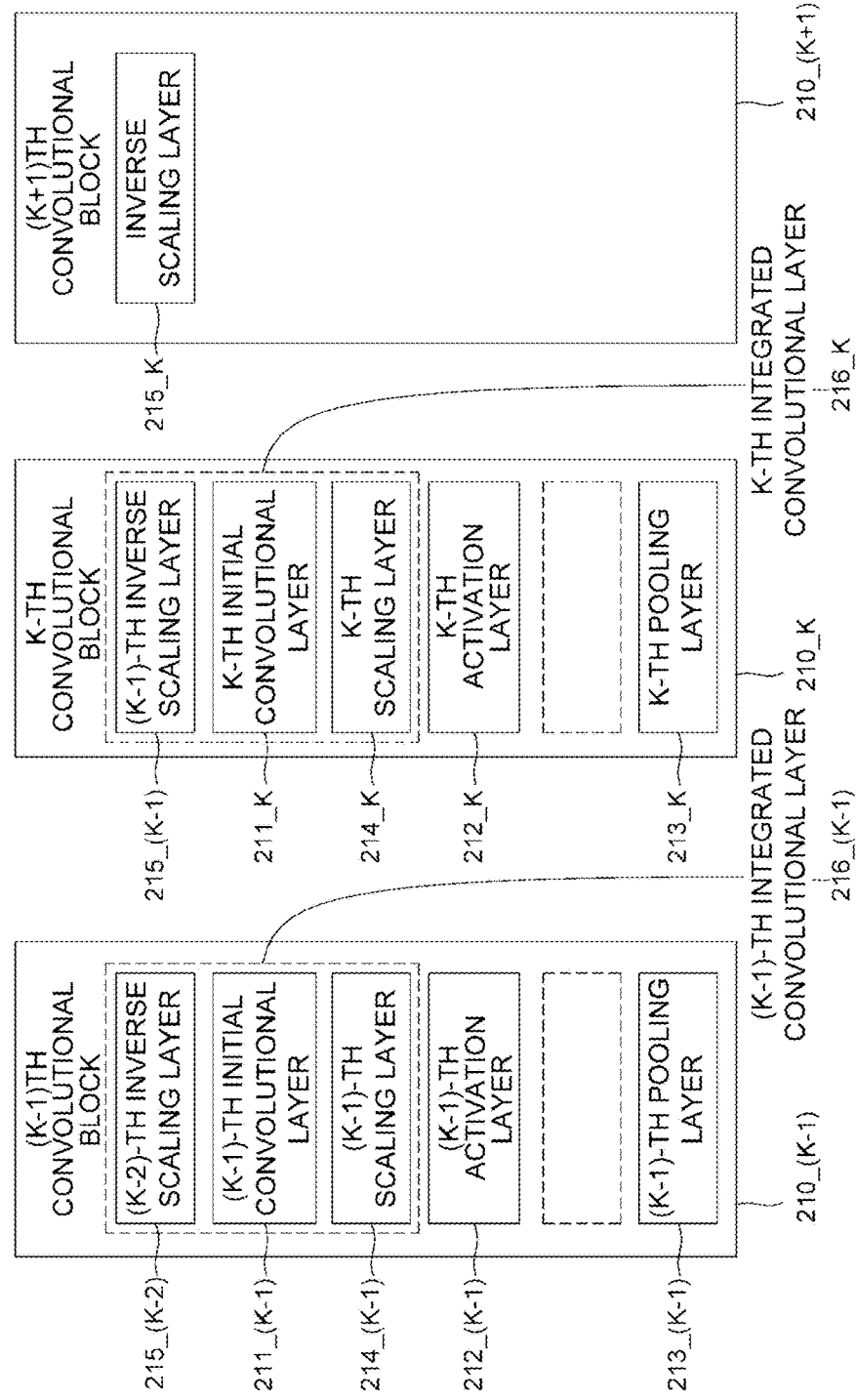

FIG. 3A and FIG. 3B show a process of generating the integrated convolutional layers by switching locations of the scaling layers and the inverse scaling layers in accordance with the present disclosure.

By referring to FIGS. 3A and 3B, the (k−1)-th inverse scaling layer 215_(k−1) included in a (k−1)-th convolutional block 210_(k−1) can be moved to the k-th convolutional block 210_k. It is because a (k−1)-th pooling layer 213_(k−1) itself is not related to change of values.

By referring of FIG. 3B, the (k−1)-th inverse scaling layer 215_(k−1), the k-th initial convolutional layer 211_k and the k-th scaling layer 214_k may be merged to generate a k-th integrated convolutional layer 216_k. The computing device 100 may determine parameters of the k-th integrated convolutional layer 216_k such that a difference between (i) a result generated by applying operations of the (k−1)-th inverse scaling layer, the k-th initial convolutional layer and the k-th scaling layer to input values and (ii) a result generated by applying operations of the k-th integrated convolutional layer to the input values is smaller than the threshold value. Herein, the merging processes explained so far may include processes of multiplying corresponding components of the (k−1)-th inverse scaling layer 215_(k−1), the k-th initial convolutional layer 211_k and the k-th scaling layer 214_k, but it may not be limited to this.

A case that k is 1 is not shown in FIG. 3B, but it is self-evident that only a first initial convolutional layer 211_1 and a first scaling layer 214_1 will be used for generating an integrated convolutional layer 216_1, because there is no inverse scaling layer which can be moved from its previous convolutional block.

The processes explained above are for generating the parameters of the k-th integrated convolutional layer 216_k, which are optimized for quantization. Herein, the quantization processes, which can be performed independently of the process for generating the parameters of the k-th integrated convolutional layer 216_k, will be explained. Accordingly, the computing device 100 may quantize the weights included in the k-th convolutional block 210_k to thereby generate k-th quantized weights, as optimized weights for CNN operations performed by the k-th convolutional block 210_k, before, while, or after the process of generating the k-th integrated convolutional layer 216_k is performed.

Advantages of the optimized quantized CNN weights will be explained by referring to the FIG. 4.

Figure 4:
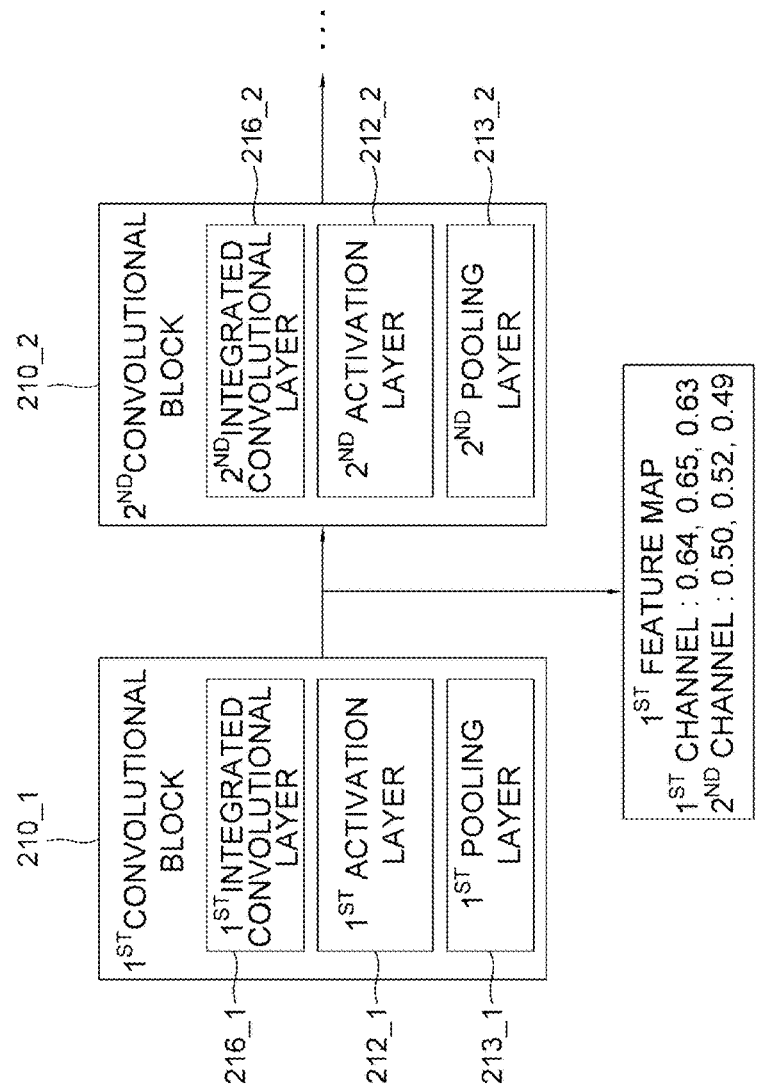
FIG. 4 shows example values of different channels whose values do not vary a lot owing to a scaling method provided by the present disclosure.

FIG. 4 shows example values of different channels whose values do not vary a lot owing to the scaling method provided by the present disclosure.

Figure 5:
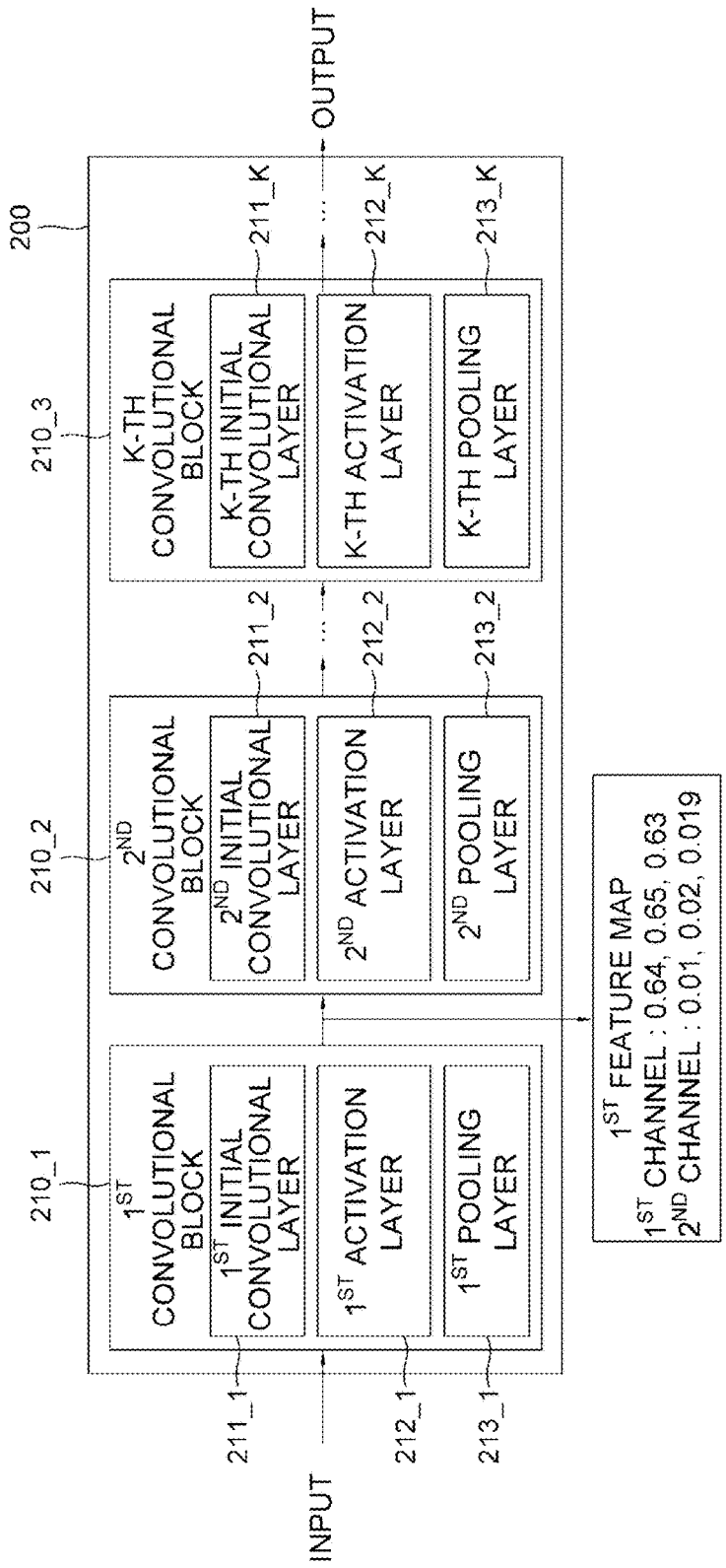
FIG. 5 shows example values of different channels whose values vary a lot according to a conventional method.

Prior to explanation, by referring to FIG. 5, it is confirmed that values of a second channel included in a first feature map are much smaller than values of a first channel included therein if the method provided by the present disclosure were not applied to. In contrast, by referring to FIG. 4, it can be seen that the values of the first channel and the values of the second channel are similar. It is owing to first scaling parameters, which are reflected on weights of the first integrated convolutional layer 216-1. Because differences between the first values and the second values are not large, the first values and the second values can be quantized properly after the operations performed by a second convolutional block 210-2.

Herein, the weights are generated by using the scaling parameters and the inverse scaling parameters, such that those are all same sort of values. However, to differentiate between values generated newly in the quantization process and values which have been existed before the quantization process, the term "parameter" and the term "weight" are used differently. Accordingly, values represented by the term "parameter" and values represented by the term "weight" are the same type despite different terms.

It is an advantage of the present disclosure to provide a method for transforming CNN layers to flatten values included in at least one feature map in order to properly reflect values of specific channels including small values on output values.

The CNN can be used for mobile devices, compact networks, and the like with high precision via hardware optimization through the method provided by the present disclosure.

The objects of the technical solution of the present disclosure or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present disclosure or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high-level code that can be used by an interpreter etc., which is executed by a computer. The aforementioned hardware devices can work as more than a software module to perform the action of the present disclosure and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present disclosure has been explained by specific matters such as detailed components, limited embodiments, and drawings. While the disclosure has been shown and described with respect to the preferred embodiments, it, however, will be understood by those skilled in the art that various changes and modification may be made without departing from the spirit and scope of the disclosure as defined in the following claims.

Accordingly, the thought of the present disclosure must not be confined to the explained embodiments, and the following patent claims as well as everything including variants equal or equivalent to the patent claims pertain to the category of the thought of the present disclosure.

What is claimed is:

1. A method for transforming convolutional layers of a CNN including m convolutional blocks, comprising steps of:

(a) the computing device, if an input image to be used for determining scaling parameters is acquired, generating one or more k-th quantization loss values by referring to (i) one or more k-th initial weights of a k-th initial convolutional layer included in a k-th convolutional block, (ii) (ii−1) the input image in case k is 1, (ii−2) a (k−1)-th feature map, corresponding to the input image, outputted from the (k−1)-th convolutional block in case k is from 2 to m, and (iii) (iii−1) each of k-th scaling parameters corresponding to each of channels included in the input image, in case k is 1 and (iii−2) each of k-th scaling parameters corresponding to each of channels included in the (k−1)-th feature map, in case k is from 2 to m, wherein k is an integer from 1 to m;

(b) the computing device determining each of k-th optimized scaling parameters, corresponding to each of the channels included in the (k−1)-th feature map, among the k-th scaling parameters by referring to the k-th quantization loss values;

(c) the computing device generating a k-th scaling layer and a k-th inverse scaling layer by referring to the k-th optimized scaling parameters; and (d) the computing device, (i) in case k is 1, transforming the k-th initial convolutional layer into a k-th integrated convolutional layer by using the k-th scaling layer, and (ii) in case k is an integer from 2 to m, transforming the k-th initial convolutional layer into the k-th integrated convolutional layer by using the k-th scaling layer and the (k−1)-th inverse scaling layer.

2. The method of claim 1, wherein, at the step of (a), the computing device generates the k-th quantization loss values by further referring to (iv) a BW value, which is the number of bits used to represent weights included in the CNN and values included in feature maps as the binary number and (v) a k-th FL value, which is an absolute value of an exponent of a number represented by an LSB of (i) the k-th initial weights of the k-th initial convolutional layer and (ii) the values included in the (k−1)-th feature map in case k is 2 to m, and the values included in the input image in case k is 1.

3. The method of claim 2, wherein, at the step of (a), the k-th quantization loss values are generated by following a formula below, $$\Delta L_k = \sum \frac{\delta L_k}{\delta \theta_p} \frac{Q(C_{k_i}\theta_p, FL, BW)}{C_{k_i}}$$

wherein $\theta_p$ includes (i) values of the (k−1)-th feature map and the k-th initial weights of the k-th initial convolutional feature map in case k is 2 to m, and (ii) values of the input image and the k-th initial weights of the k-th initial convolutional feature map in case k is 1, $C_{k_i}$ is a specific k-th scaling parameter among the k-th scaling parameters, FL and BW are the FL value and the BW value respectively, Q operation is an operation for generating differences between $C_{k_i}\theta_i$ and a quantized value of $C_{k_i}\theta_i$ generated by referring to the FL value and the BW value, wherein, at the step of (b), the computing device determines each of the k-th optimized scaling parameters by selecting the $C_{k_i}$ which makes the $\Delta L_k$ smallest.

4. The method of claim 3, wherein the computing device selects the $C_{k_i}$ by using Nesterov Accelerated Gradient method to thereby determine the k-th optimized scaling parameters.

5. The method of claim 1, wherein, at the step of (c), the computing device generates the k-th scaling layer whose components are determined as each of the k-th optimized scaling parameters, and generates the k-th inverse scaling layer whose components are determined as each of inverse of the k-th optimized scaling parameters.

6. The method of claim 1, wherein, at the step of (d), the computing device, (1) in case k is 1, transforms the k-th initial convolutional layer into the k-th integrated convolutional layer such that a difference between (i) a result generated by applying operations of the k-th initial convolutional layer and the k-th scaling layer to input values and (ii) a result generated by applying operations of the k-th integrated convolutional layer to the input values is smaller than a threshold value, and (2) in case k is an integer from 2 to m, transforms the k-th initial convolutional layer into the k-th integrated convolutional layer such that a difference between (i) a result generated by applying operations of a (k−1)-th inverse scaling layer, the k-th initial convolutional layer and the k-th scaling layer to the input values and (ii) a result generated by applying operations of the k-th integrated convolutional layer to the input values is smaller than the threshold value.

7. The method of claim 1, further comprising a step of:
(e) the computing device quantizing weights of the k-th integrated convolutional layer included in the k-th convolutional block to thereby generate k-th quantized weights as optimized weights for CNN operations performed by the k-th convolutional block.

8. A computing device for transforming convolutional layers of a CNN including m convolutional blocks, comprising:
at least one memory that stores instructions; and
at least one processor configured to execute the instructions to: perform processes of (I) generating one or more k-th quantization loss values by referring to (i) one or more k-th initial weights of a k-th initial convolutional layer included in a k-th convolutional block, (ii) (ii-1) an input image to be used for determining scaling parameters in case k is 1, (ii-2) a (k−1)-th feature map, corresponding to the input image, outputted from the (k−1)-th convolutional block in case k is from 2 to m, and (iii) (iii-1) each of k-th scaling parameters corresponding to each of channels included in the input image, in case k is 1 and (iii-2) each of k-th scaling parameters corresponding to each of channels included in the (k−1)-th feature map, in case k is from 2 to m, wherein k is an integer from 1 to m, (II) determining each of k-th optimized scaling parameters, corresponding to each of the channels included in the (k−1)-th feature map, among the k-th scaling parameters by referring to the k-th quantization loss values, (III) generating a k-th scaling layer and a k-th inverse scaling layer by referring to the k-th optimized scaling parameters, and (IV) (i) in case k is 1, transforming the k-th initial convolutional layer into a k-th integrated convolutional layer by using the k-th scaling layer, and (ii) in case k is an integer from 2 to m, transforming the k-th initial convolutional layer into the k-th integrated convolutional layer by using the k-th scaling layer and the (k−1)-th inverse scaling layer.

9. The computing device of claim 8, wherein, at the process of (I), the processor generates the k-th quantization loss values by further referring to (iv) a BW value, which is the number of bits used to represent weights included in the CNN and values included in feature maps as the binary number and (v) a k-th FL value, which is an absolute value of an exponent of a number represented by an LSB of (1) the k-th initial weights of the k-th initial convolutional layer and (2) the values included in the (k−1)-th feature map in case k is 2 to m, and the values included in the input image in case k is 1.

10. The computing device of claim 9, wherein, at the process of (I), the k-th quantization loss values are generated by following a formula below, $$\Delta L_k = \sum \frac{\delta L_k}{\delta \theta_p} \frac{Q(C_{k_i}\theta_p, FL, BW)}{C_{k_i}}$$

wherein $\theta_p$ includes (i) values of the (k−1)-th feature map and the k-th initial weights of the k-th initial convolutional feature map in case k is 2 to m, and (ii) values of the input image and the k-th initial weights of the k-th initial convolutional feature map in case k is 1, $C_{k_i}$ is a specific k-th scaling parameter among the k-th scaling parameters, FL and BW are the FL value and the BW value respectively, Q operation is an operation for generating differences between $C_{k_i}\theta_i$ and a quantized value of $C_{k_i}\theta_i$ generated by referring to the FL value and the BW value, wherein, at the step of (b), the computing device determines each of the k-th optimized scaling parameters by selecting the $C_{k_i}$ which makes the $\Delta L_k$ smallest.

11. The computing device of claim 10, wherein the processor selects the $C_{k_j}$ by using Nesterov Accelerated Gradient method to thereby determine the k-th optimized scaling parameters.

12. The computing device of claim 8, wherein, at the process of (III), the processor generates the k-th scaling layer whose components are determined as each of the k-th optimized scaling parameters, and generates the k-th inverse scaling layer whose components are determined as each of inverse of the k-th optimized scaling parameters.

13. The computing device of claim 8, wherein, at the process of (IV), the processor, (1) in case k is 1, transforms the k-th initial convolutional layer into the k-th integrated convolutional layer such that a difference between (i) a result generated by applying operations of the k-th initial convolutional layer and the k-th scaling layer to input values and (ii) a result generated by applying operations of the k-th integrated convolutional layer to the input values is smaller than a threshold value, and (2) in case k is an integer from 2 to m, transforms the k-th initial convolutional layer into the k-th integrated convolutional layer such that a difference between (i) a result generated by applying operations of a (k−1)-th inverse scaling layer, the k-th initial convolutional layer and the k-th scaling layer to the input values and (ii) a result generated by applying operations of the k-th integrated convolutional layer to the input values is smaller than the threshold value.

14. The computing device of claim 8, wherein the processor further performs a process of:
 (V) quantizing weights of the k-th integrated convolutional layer included in the k-th convolutional block to thereby generate k-th quantized weights as optimized weights for CNN operations performed by the k-th convolutional block.

* * * * *